US012308789B2

(12) United States Patent
Gomez

(10) Patent No.: US 12,308,789 B2
(45) Date of Patent: May 20, 2025

(54) SYSTEM, APPARATUS, AND METHOD FOR HARNESSING ENERGY FROM THE SUN WITHOUT OCCUPYING A LARGE SURFACE AREA

(71) Applicant: Eduardo Gomez, Hialeah, FL (US)

(72) Inventor: Eduardo Gomez, Hialeah, FL (US)

( * ) Notice: Subject to any disclaimer, the term of this patent is extended or adjusted under 35 U.S.C. 154(b) by 326 days.

(21) Appl. No.: 17/815,955

(22) Filed: Jul. 29, 2022

(65) Prior Publication Data

US 2023/0029693 A1  Feb. 2, 2023

Related U.S. Application Data

(60) Provisional application No. 63/203,722, filed on Jul. 29, 2021.

(51) Int. Cl.
H02S 40/22 (2014.01)
H02J 3/38 (2006.01)
H02S 20/10 (2014.01)
H02S 20/20 (2014.01)

(52) U.S. Cl.
CPC .............. H02S 40/22 (2014.12); H02J 3/381 (2013.01); *H02J 2300/24* (2020.01); *H02S 20/10* (2014.12); *H02S 20/20* (2014.12)

(58) Field of Classification Search
CPC .......... H02S 40/22; H02S 3/381; H02S 20/10; H02S 20/20; H02J 300/24
See application file for complete search history.

(56) References Cited

U.S. PATENT DOCUMENTS

| 4,026,267 | A | * | 5/1977 | Coleman | F24S 23/30 136/246 |
| 4,529,830 | A | * | 7/1985 | Daniel | F21S 11/00 136/246 |
| 5,089,055 | A | * | 2/1992 | Nakamura | F24S 23/12 136/246 |
| 5,501,743 | A | * | 3/1996 | Cherney | F24S 23/30 136/246 |
| 2005/0039791 | A1 | * | 2/2005 | Johnson | F03G 6/068 136/246 |
| 2008/0216888 | A1 | * | 9/2008 | Miller | H01M 50/204 136/246 |
| 2011/0247677 | A1 | * | 10/2011 | Forsyth | H01L 31/0547 136/246 |
| 2015/0175024 | A1 | * | 6/2015 | Bell | H02S 40/22 320/101 |
| 2016/0344336 | A1 | * | 11/2016 | Balakrishnan | H02S 40/38 |
| 2019/0131921 | A1 | * | 5/2019 | Bae | H02S 40/425 |
| 2020/0076362 | A1 | * | 3/2020 | Ahdoot | F21S 11/002 |

* cited by examiner

*Primary Examiner* — Sadie White
(74) *Attorney, Agent, or Firm* — Mark T. Vogelbacker; Eckert Seamans Cherin & Mellott, LLC

(57) ABSTRACT

A system configured to efficiently generate electricity from the Sun without occupying a large area of land can include at least one distribution center and at least two solar panels. Each solar panel can include a first side having a plurality of photovoltaic cells configured to sense sunlight. The first side of each of the at least two solar panels facing the at least one distribution center such that the at least one distribution center is located between the at least two solar panels.

6 Claims, 5 Drawing Sheets

SYSTEM, APPARATUS, AND METHOD FOR HARNESSING ENERGY FROM THE SUN WITHOUT OCCUPYING A LARGE SURFACE AREA

CROSS-REFERENCE TO RELATED APPLICATION

The present application claims priority to U.S. Provisional Application No. 63/203,722, filed Jul. 29, 2021 and titled "SYSTEM, APPARATUS, AND METHOD FOR EFFICIENTLY GENERATING ELECTRICITY FROM THE SUN WITHOUT OCCUPYING A LARGE SURFACE AREA", the entire disclosure of which is hereby incorporated by reference.

FIELD

The presently disclosed technology relates generally to harnessing energy from the Sun and/or efficient generation of electricity, and more particularly to a system, apparatus, and method that utilizes solar panels, including organic photovoltaic, such as but not limited to Perovskite solar cells, and other technologies, in an efficient and space-saving manner to generate electricity and/or store energy for later use.

BACKGROUND

Solar energy is radiant light and heat from the Sun that is harnessed using a range of ever-evolving technologies, such as solar heating, photovoltaics, solar thermal energy, solar architecture, molten salt power plants, artificial photosynthesis, and organic photovoltaic.

A solar panel generates electricity when particles of sunlight knock electrons free from atoms, setting in motion a flow of electrons. This flow of electrons is electricity, and solar panels are designed to capture this flow, making it a usable electric current. Solar power generation starts when a solar panel absorbs or receives sunlight with photovoltaic cells, generating direct current (DC) energy and then converting it to usable alternating current (AC) energy with an inverter. AC energy then flows through the home's, for example, electrical panel and is distributed accordingly.

A conventional solar panel or solar module includes a layer of silicon cells, a frame, a casing, and wiring to allow current to flow from the silicon cells. Silicon, which is number 14 on the Periodic Table, is a nonmetal with conductive properties that allow it to absorb and convert sunlight into electricity. When light interacts with a silicon cell, it causes electrons to be set into motion, which initiates a flow of electric current. This is known as the "photovoltaic effect".

It is known to arrange solar panels to face the direction that is most likely to receive the most sunlight in a given period. For example, in the Northern Hemisphere, solar panels are arranged to face the sky, often looking southward and/or westward.

With the worldwide push to more renewable energies, solar energy is becoming an essential source of renewable energy. The U.S. solar industry had a record year in 2020, despite the coronavirus pandemic. It has been estimated that over the next decade, solar installations could quadruple from current levels.

Despite the numerous benefits of solar energy and solar panels, there are many challenges in the industry.

SUMMARY

One of the challenges with generating megawatts of power from solar panels is the large "footprint," scale, or area required to absorb a sufficient amount of sunlight. For example, some of the largest solar power generators in the world are spread out over large swaths of land, or consume large portions of a roof of a building. Based on currently available technology, including organic photovoltaic (OPV) cells, this large "footprint" is necessary to harness a commercially-viable amount of sunlight. It can be expensive to buy and maintain the land necessary for such large solar farms, or maintain the roofing or tree and vegetation clearance. The presently disclosed technology overcomes the above and other challenges in the prior art.

In one embodiment, the presently disclosed technology is directed to a system configured to efficiently generate electricity from the Sun without occupying a large area of land. The system can include at least one distribution center and at least two solar panels. Each solar panel can include a first side having a plurality of photovoltaic cells configured to sense sunlight and an opposing second side devoid of any photovoltaic cells and not configured to sense sunlight. The first side of each of the at least two solar panels facing the at least one distribution center such that the at least one distribution center is located between the at least two solar panels.

In another embodiment, the presently disclosed technology is directed to a system which will generate electricity using high efficiency solar panels and components, the shape of the panels may be flat, round or other. This system will bring sun light to solar panels via fiber optics or similar technology. This system may include two flat solar panels facing each other, layers of round panels or other shape. These layers of panels can include a bundle of fiber optics bringing enough sunlight into the solar panels so that the solar panels generate electricity the same as if they were lying flat and pointing towards the Sun, as in prior art systems or arrangements. The other end of the fiber optic cluster can be pointed at the Sun via a sun tracking mechanism. The bundle of fiber optics can be fastened to the mechanism using various mechanical and/or electrical items to assist in the following of the sun across the sky automatically for maximum sunlight absorption during daylight hours. These components can be stacked, thus increasing the generation of electricity with the same amount of square footage.

In yet another embodiment, the presently disclosed technology is directed to facing solar panels toward a distribution center and not necessarily toward the Sun or the sky. The distribution center allows the solar panels to be arranged in a more compact manner than taught in the prior art, without sacrificing efficiency.

In still another embodiment, the presently disclosed technology is directed to transfer of sun light through fiber optics or other transfer technology, such digital transmittal systems or similar technology, which changes or converts the sun light signal to digital or another format to be transferred through fiber optics for re-digitalization on the other end.

BRIEF DESCRIPTION OF THE SEVERAL VIEWS OF THE DRAWINGS

The foregoing summary, as well as the following detailed description of the presently disclosed technology, will be better understood when read in conjunction with the appended drawings. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
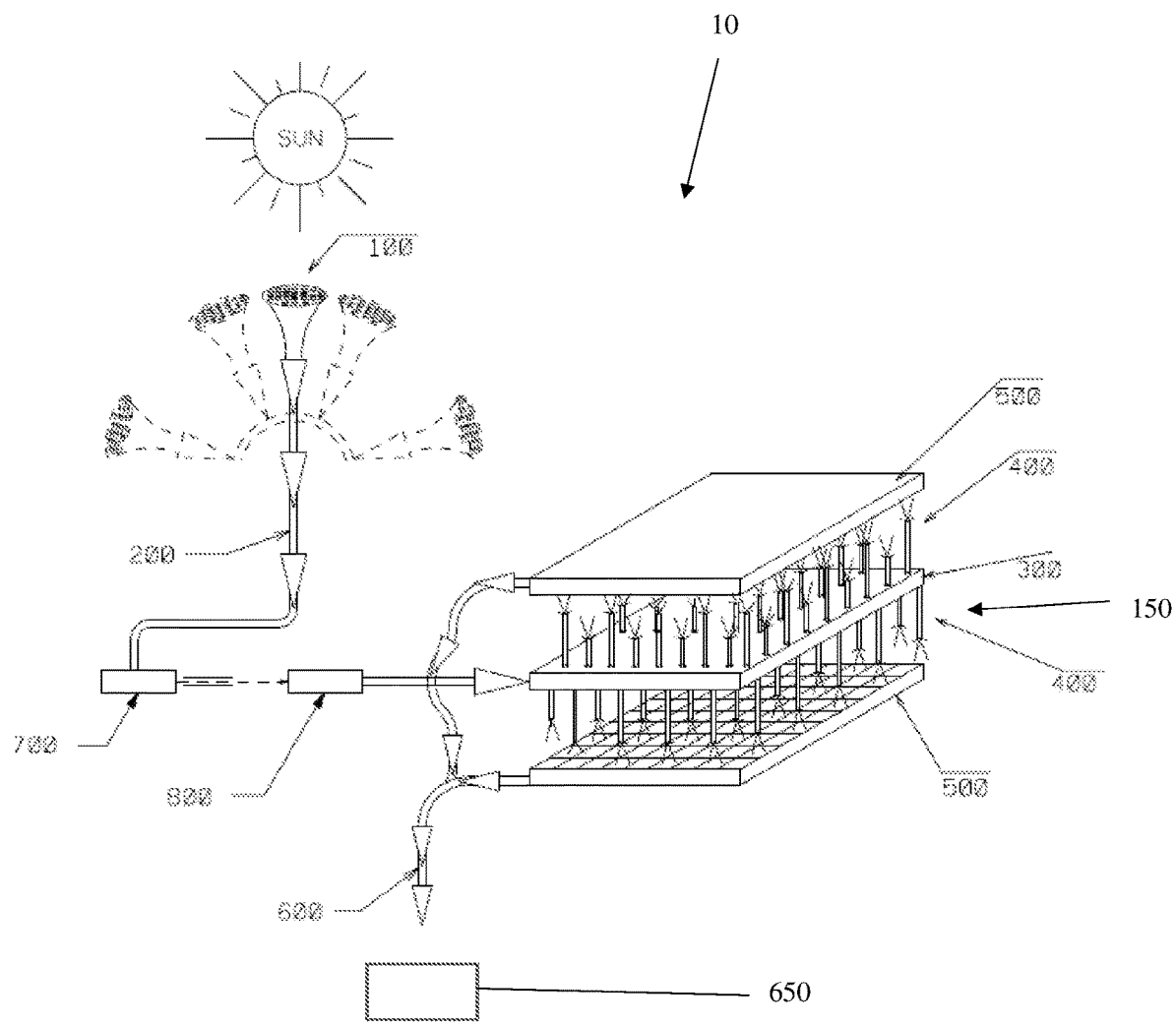
FIG. 1 is a schematic view of a system according to an embodiment of the presently disclosed technology, wherein certain components may be shown partially exploded for clarity.

While systems, devices and methods are described herein by way of examples and embodiments, those skilled in the art recognize that the systems, devices and methods of the presently disclosed technology are not limited to the embodiments or drawings described. Rather, the presently disclosed technology covers all modifications, equivalents and alternatives falling within the spirit and scope of the appended claims. Any headings used herein are for organizational purposes only and are not meant to limit the scope of the description or the claims.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." As used herein, the word "may" is used in a permissive sense (i.e., meaning having the potential to) rather than the mandatory sense (i.e., meaning must). The terminology includes the words noted above, derivatives thereof and words of similar import.

Referring to the drawings in detail, wherein like numerals indicate like elements throughout, FIGS. 1-5 show a system, generally designated 10, according to the presently disclosed technology, configured to harness energy and/or efficiently generate electricity from the Sun without occupying a large area of land, and/or increase the efficiency of capacity of conventional solar farms. The system 10 is designed to reduce the amount of land, space, and/or surface area required or needed to harness an appreciable or commercially profitable amount of solar energy.

The system 10 can include at least one Sun tracker mechanism or at least one light sensing unit, generally designated 100. The light sensing unit 100 can be configured to follow, mimic, or track the Sun across the sky such that the light sensing unit 100, or at least a portion thereof, can move in response to movement of the Sun across the sky and/or with respect to the ground surface. Thus, at least one end of the light sensing unit 100 directly faces the Sun during daytime hours. Additionally, the light sensing unit 100 can be configured to receive and/or process sunlight, such as through fiber optics or similar technology. The light sensing unit 100 allows the system 10 to pick-up and/or transfer the greatest amount of sunlight possible throughout the daylight hours.

The light sensing unit 100 can include at least a motor and a base. The motor can be operatively connected to the base such that rotation of an output shaft of the motor causes the base and/or the one end to move with respect to the motor. In particular, the light sensing unit 100 can include (but is not limited to) at least one of the following: a base 110, supports, vertical and/or horizontal panels, one or more motors 120, one or more motor controllers 140, electronics, sunlight sensors 160, gears, belts and/or chains 170, axis 172, shafts 174, fasteners, clamps, covers, epoxies, glass, and other components all to be driven by internal solar panels and or solar power charged batteries. Optionally, the light sensing unit 100 can include one or more mirrors, filters, and/or prisms to enhance or focus the sun light.

The system 10 can also include a combination, generally designated 150, operatively connected to the light sensing unit 100. The combination 150 can include at least one distribution panel or center 300 and at least two solar panels 500. Optionally, each distribution center 300 can include or be formed by fiber optics or other light-conveying technology arranged in a way that shines, projects, and/or directs light received from the one or more light sensing units 100 onto each of the solar panels 500. Optionally, each distribution center 300 and/or solar panel 500 can include one or more mirrors, filters, and/or prisms to enhance or focus the sun light. The combination 150 can be held together with any of a variety of fasteners, such as wire ties, clamps, or adhesive, for example.

Figure 2:
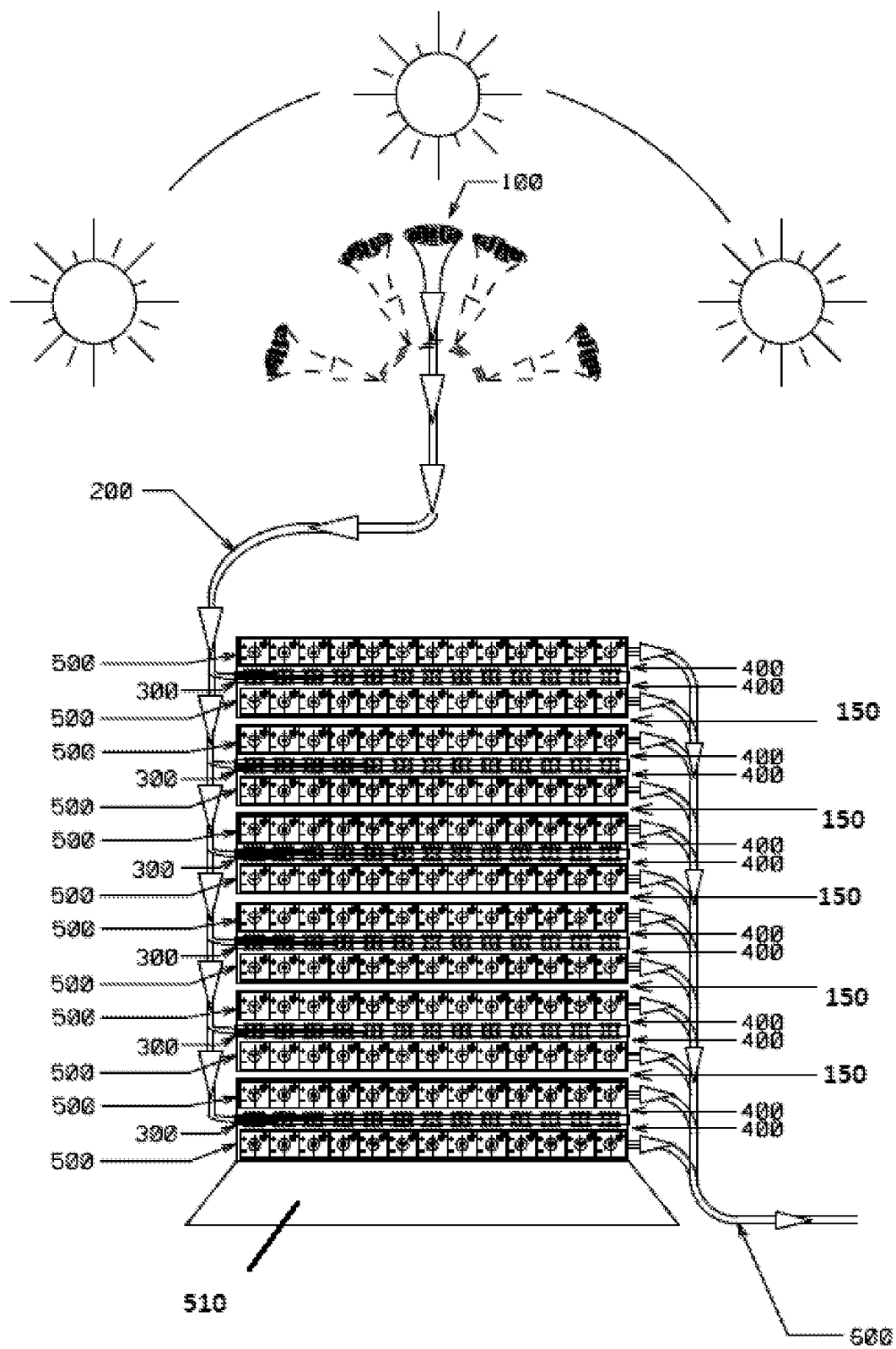
FIG. 2 is another schematic view of the presently disclosed technology, wherein certain components are stacked one above another.

FIG. 1 shows one combination 150 operatively connected to one light sensing unit 100. FIG. 2 shows one light sensing unit operatively connected to a plurality of the combinations 150. Those of ordinary skill in the art would understand that the presently disclosed technology includes operatively connecting a plurality of spaced-apart light sensing units 100 to one of the combinations 150 or to a plurality of the combinations 150.

Those of ordinary skill in the art would understand that FIG. 1 shows an exaggerated distance between the distribution panel 300 and each solar panel 500. This exaggerated distance is intended to more clearly show the operation of the combination 150. In practice, the solar panels 500 will be placed as close to the distribution center 300 as possible, yet be at an ideal distance or within an ideal distance range to be as efficient as possible.

Each distribution center 300 can have a size and shape (e.g., length and width) that generally or exactly mirrors that of each solar panel 500. For example, each distribution center 300 can be rectangular in shape. Each distribution center 300 and each solar panel 500 can extend in a plane. Each plane can extend generally or exactly parallel. The distribution center 300 can be configured to receive energy from the light sensing unit 100 (e.g., such as through fiber optics or similar technology, as described below) and distribute the energy toward and/or to the solar panels 500. The benefit of this design is that two solar panels 500 can be supplied with energy while only occupying the footprint of a single solar panel.

Each solar panel 500 can include a first side and an opposing second side. The first side of each solar panel 500 can have, expose, house, and/or protect a plurality of photovoltaic cells 520 (see FIG. 4) configured to sense sunlight and/or generate electricity. The first side of each solar panel 500 can face or be directed toward the distribution center 300 such that the distribution center 300 is located (e.g., sandwiched) between the two solar panels 500. Thus, a first one of the solar panels 500 can be placed facing downward, and a second one of the solar panels 500 can be placed facing upward.

The first side of each of the solar panels 500 can be operatively and/or directly connected to the distribution center 300 by one or more fiber optic strands 400 extending therebetween. The location of the one or more fiber optic strands 400 can be placed or fixed in the most efficient positions between the solar panels 500 and the distribution center 300. Light from the fiber optic strand(s) 400 can be projected onto the photovoltaic cells to generate electricity.

Optionally, the second side of each solar panel 500 can be devoid of any photovoltaic cells and not configured to sense sunlight. Alternatively, the second side of each solar panel 500 can have, expose, house, and/or protect a plurality of photovoltaic cells 520 configured to sense sunlight. In this alternative arrangement, each side of the solar panel 500 includes photovoltaic cells 520 on both opposing sides thereof and these solar panels 500 can receive and/or process solar light from each side thereof.

A fiber optics bundle 200, or similar technology, can operatively attach the light sensing unit 100 to the combination 150. In particular, a first end of the fiber optics bundle 200 can be operatively and/or directly connected to the light sensing unit 100, and an opposing second end of the fiber optics bundle 200 can be operatively and/or directly connected to the distribution center 300. More particularly, an end of the fiber optics bundle 200 opposite the light sensing unit 100 can go into or enter each of the distribution centers 300 in order to project the sunlight picked up from the light sensing unit 100. The fiber optics bundle 200 can be surrounded or at least partially covered by an insulated shield, sheath, or cover. Optionally, the light sensing unit 100 can be located outside of a building (e.g., in a parking lot or a field, or on top of the building), and the combination 150 can be located inside of the building, where the fiber optics bundle extends from outside the building to inside the building.

In one optional embodiment, the system 10 can include a digital transmission system sending unit 700 and a digital transmission system receiving unit 800 operatively connected to the digital transmission system sending unit 700. The strength of fiber optic signals diminishes with distance, it can be beneficial to take the signal(s) and transfer it or them to digital format to allow long distance propagation using transmitters and the like. The digital transmission system sending unit 700 is configured to receive energy and/or sunlight and convert it to one or more digital signals. The digital transmission system receiving unit 800 is configured to receive one or more digital signals and change it or them back to the form or energy initially received by the digital transmission system sending unit 700. Of course, the presently disclosed technology includes other types of technology, aside from digital transfers, that could be used in place of the digital transmission system sending unit 700 and the digital transmission system receiving unit 800.

Figure 3:
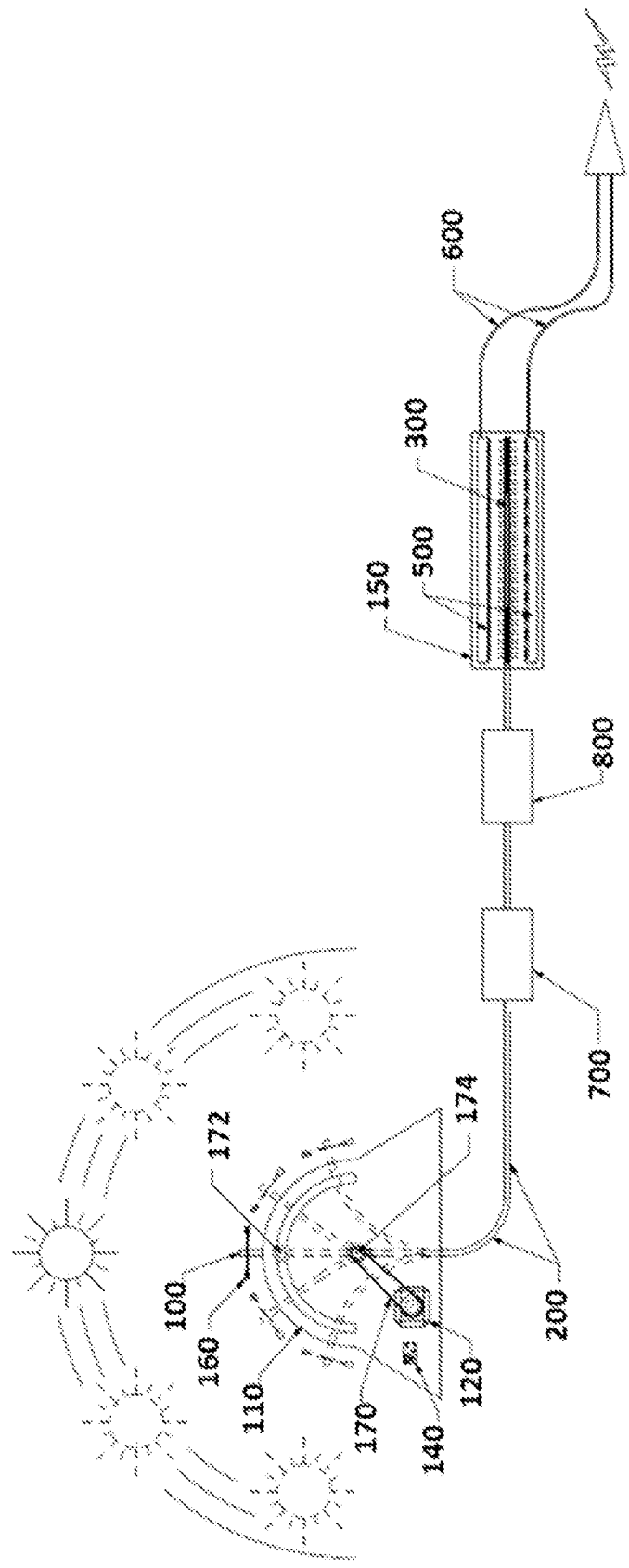
FIG. 3 is yet another schematic view, in an elevation view, of the presently disclosed technology, where certain or optional portions or components may be omitted for clarity.
Figure 4:
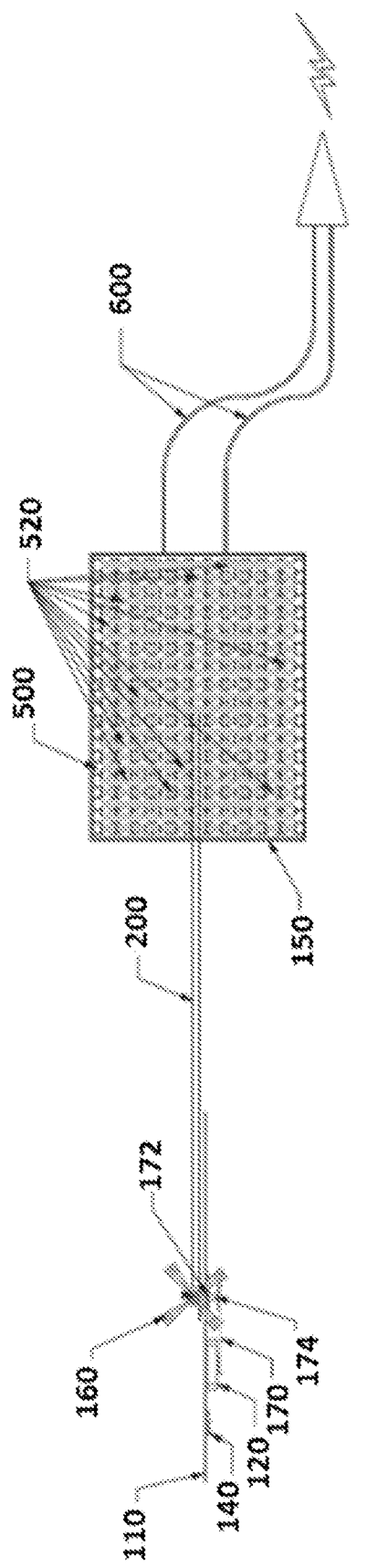
FIG. 4 is still a further schematic view, from a top plan view, of one optional embodiment of the presently disclosed technology.

In the optional embodiment shown in FIG. 3, the digital transmission system sending unit 700 is upstream of the digital transmission system receiving unit 800. Each of the digital transmission system sending unit 700 and the digital transmission system receiving unit 800 can form part of the fiber optics bundle 200, or can be operatively connected to and downstream of the fiber optics bundle 200. In one optional embodiment, the digital transmission system sending unit 700 is located outside of the building and the digital transmission system receiving unit 800 is located inside of the building.

One or more electrical cords 600 can operatively attach each solar panel 500 to a power bank 650. In particular, first ends of the electrical cord 600 can be operatively connected to each solar panel 500, and an opposing second end of the electrical cord 600 can be operatively connected to the power bank 650. Optionally, the power bank 650 can be one or more batteries, a power company, capacitors, motors, or anything else that can use the energy immediately, for example. Energy supplied to the power bank 650 can be used for any of a variety of purposes, such as being sold to power companies and/or used to one or more power buildings and/or automobiles.

As shown in FIG. 2, the combination 150 can include a plurality of distribution centers 300 and solar panels 500 placed one on top of another so as to occupy a footprint of only a single solar panel 500. Optionally, the combination 150 can include two or more (e.g., six or more) distribution centers 300 vertically spaced-apart. Between each adjacent pair of distribution centers 300 can be two solar panels 500 that face opposite directions. A bottom one of the plurality of solar panels 500 can rest on or be supported by a base 510. A bottom surface of the base 510 can rest directly on a ground surface or a roof, for example. The base 510 can be used to house or store batter banks, the power bank 650 (see FIG. 1), spare parts, or other items.

In operation, as shown in FIG. 1, energy is received at and flows from the light sensing unit 100 to the at least one distribution center 300. From the at least one distribution center 300, energy flows to two solar panels 500. From the two solar panels 500, energy flows to the power bank 650.

Optionally, the combination 150 can include a decorative outside finish or appearance or be placed within a shell or cover (e.g., camouflage to blend into the surrounding nature or a color to make that of a nearby house or building)

In one embodiment, any heat generated from the transfer of energy among or between the various components of the system 100 can be used in an efficient manner. For example, in addition to any electricity produced by the system 100, any heat generated from the system 100 can be employed to heat water or power a steam generator.

Figure 5:
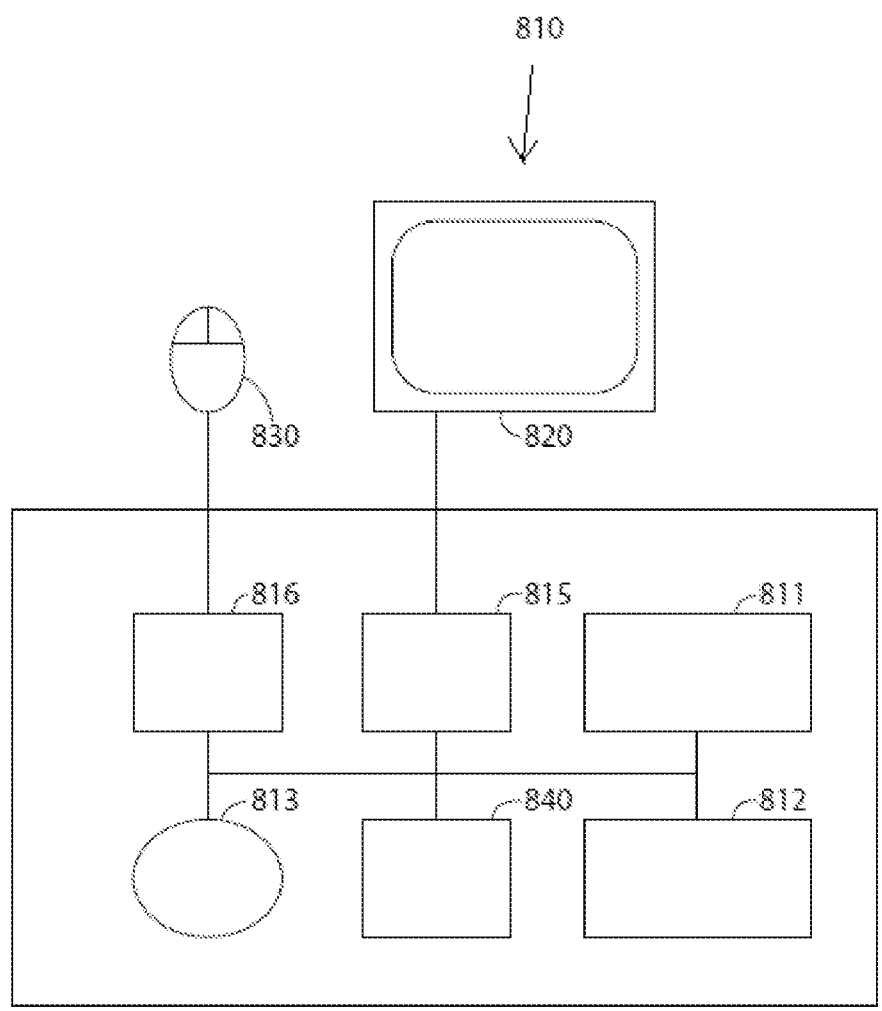
FIG. 5 is a schematic diagram of a computing system of one embodiment of the present disclosure.

One or more of the above-described techniques and/or embodiments can be implemented with or involve software, for example modules executed on one or more computing devices 810 (see FIG. 5). Of course, modules described herein illustrate various functionalities and do not limit the structure or functionality of any embodiments. Rather, the functionality of various modules may be divided differently and performed by more or fewer modules according to various design considerations.

Each computing device 810 may include one or more processing devices 811 designed to process instructions, for example computer readable instructions (i.e., code), stored in a non-transient manner on one or more storage devices 813. By processing instructions, the processing device(s) 811 may perform one or more of the steps and/or functions disclosed herein. Each processing device may be real or virtual. In a multi-processing system, multiple processing units may execute computer-executable instructions to increase processing power.

The storage device(s) 813 may be any type of non-transitory storage device (e.g., an optical storage device, a magnetic storage device, a solid-state storage device, etc.). The storage device(s) 813 may be removable or non-removable, and may include magnetic disks, magneto-optical disks, magnetic tapes or cassettes, CD-ROMs, CD-RWs, DVDs, BDs, SSDs, or any other medium which can be used to store information. Alternatively, instructions may be stored in one or more remote storage devices, for example storage devices accessed over a network or the internet.

Each computing device 810 additionally may have memory 812, one or more input controllers 816, one or more output controllers 815, and/or one or more communication connections 840. The memory 812 may be volatile memory (e.g., registers, cache, RAM, etc.), non-volatile memory (e.g., ROM, EEPROM, flash memory, etc.), or some combination thereof. In at least one embodiment, the memory 812 may store software implementing described techniques.

An interconnection mechanism 814, such as a bus, controller or network, may operatively couple components of the computing device 810, including the processor(s) 811, the memory 812, the storage device(s) 813, the input controller(s) 816, the output controller(s) 815, the communication connection(s) 840, and any other devices (e.g., network controllers, sound controllers, etc.). The output controller(s) 815 may be operatively coupled (e.g., via a wired or wireless connection) to one or more output devices 820 (e.g., a speaker, a device capable of generating or producing noise or sound, etc.) in such a fashion that the output controller(s) 815 can transform the action(s) of the output device 820 (e.g., in response to modules executed). The input controller(s) 816 may be operatively coupled (e.g., via a wired or wireless connection) to one or more input devices 830 (e.g., a microphone, a voice input device, etc.) in such a fashion that input can be received from a user.

The communication connection(s) 840 may enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 5 illustrates the computing device 810, the output device 820, and the input device 830 as separate devices for ease of identification only. However, the computing device 810, the output device(s) 820, and/or the input device(s) 830 may be separate devices, may be integrated in a single device, or any combination of devices. The computing device 810 may be one or more servers, for example a farm of networked servers, a clustered server environment, or a cloud service running on remote computing devices.

In one embodiment, the presently disclosed technology is directed to a non-transitory computer-readable medium having computer-readable code stored thereon that, when executed by one or more computing devices, causes the one or more computed devices to perform the one or more methods disclosed or claimed herein.

Even if it is interpreted that multiple embodiments are shown and described herein, it is understood that any one or more features of any particular embodiment can be omitted or included in another embodiment.

The following exemplary embodiments further describe optional aspects of the presently disclosed technology and are part of this Detailed Description. These exemplary embodiments are set forth in a format substantially akin to claims, although they are not technically claims of the present application. The following exemplary embodiments refer to each other in dependent relationships as "embodiments" instead of "claims."

1A. A method of efficiently harnessing solar power without requiring a large footprint of land, the method comprising:
 facing a solar panel toward a distribution center on opposing sides of the distribution center;
 operatively connecting the distribution center to a light sensing unit and a power bank;
 receiving solar energy at the light sensing unit; and
 distributing electricity to the power bank for instant or future use.

2A. The method of embodiment 1A, wherein fiber optics connect the light sensing unit to the distribution center.

1B. A system for efficiently harnessing solar power without requiring a large footprint of land, wherein the system includes arranging a first solar panel to face and extend parallel with a distribution center on a first side of the distribution center, arranging a second solar panel to face and extend parallel with the distribution center on a second side of the distribution center; operatively connecting the distribution center to a light sensing unit and a power bank, such that power is configured to flow from the light sensing unit to the power bank.

2B. The system of embodiment 1B, wherein each solar panel does not include photovoltaic cells on a side facing away from the distribution center.

1C. A system configured to efficiently generate electricity from the Sun without occupying a large area of land, the system comprising:
 a light sensing unit including a motor and a base, one end of the light sensing unit being configured to receive sunlight, the light sensing unit being configured to move in response to movement of the Sun across the sky, the motor operatively connected to the base such that rotation of an output shaft of the motor causes the base and the one end to move with respect to the motor;
 a combination including at least one distribution center and at least two solar panels, each of the at least two solar panels including a first side and an opposing second side, the first and second sides of each of the at least two solar panels having a plurality of photovoltaic cells configured to sense sunlight, the first side of each of the at least two solar panels being operatively connected to the at least one distribution center by fiber optics;
 a fiber optics bundle, a first end of the fiber optics bundle being operatively connected to the light sensing unit, an opposing second end of the fiber optics bundle being operatively connected to the at least one distribution center; and
 an electrical cord having first ends operatively connected to each of the at least two solar panels and a second end operatively connected to a power bank.

2C. The system of embodiment 1C, wherein the second side of at least one of the at least two solar panels faces the Sun during daylight hours.

3C. The system of embodiment 1C, wherein the first side of each of the at least two solar panels faces the at least one distribution center such that the at least one distribution center is located between the at least two solar panels, It will be appreciated by those skilled in the art that changes could be made to the embodiments described above without departing from the broad inventive concept thereof. It is understood, therefore, that the presently disclosed technology is not limited to the particular embodiments disclosed, but it is intended to cover modifications within the spirit and scope of the presently disclosed technology as defined by the appended claims.

I claim:

1. A system configured to harness energy from the Sun without occupying a large area of land and to transfer the energy over long distances, the system comprising:
   a Sun tracker mechanism including a motor and a base, one end of the Sun tracker mechanism being configured to receive sunlight outside of a building, the Sun tracker mechanism being configured to move in response to movement of the Sun across the sky, the motor operatively connected to the base such that rotation of an output shaft of the motor causes the base and the one end to move with respect to the motor;
   at least one combination located inside of the building, the at least one combination including at least one distribution center and at least two solar panels, each of the at least two solar panels including a first side and an opposing second side, the first side of each of the at least two solar panels having a plurality of photovoltaic cells configured to sense sunlight, the first side of each of the at least two solar panels facing the at least one distribution center such that the at least one distribution center is located between the at least two solar panels, the first side of each of the at least two solar panels being operatively connected to the at least one distribution center by fiber optic strands;
   a fiber optics bundle, a first end of the fiber optics bundle being operatively connected to the Sun tracker mechanism, an opposing second end of the fiber optics bundle being operatively connected to the at least one distribution center;
   a digital transmission system sending unit and a digital transmission system receiving unit operatively connecting the fiber optics bundle to the at least one combination,
   the digital transmission system sending unit being located outside of the building, proximate to the at least one Sun tracker mechanism, and upstream from the digital transmission system receiving unit, the digital transmission system sending unit receiving energy in a first form and converting the energy to a second form, the second form being different than the first form, the second form including one or more digital signals;
   the digital transmission system receiving unit being located inside of the building and proximate to the at least one combination, the digital transmission system receiving unit being operatively connected to the digital transmission system sending unit, the digital transmission receiving unit receiving the energy in the second form and then converting the energy back to the first form thereby enabling long distance propagation of the energy; and
   an electrical cord having first ends operatively connected to each of the at least two solar panels and a second end operatively connected to a power bank, the power bank being configured to receive energy initially received from the Sun tracker mechanism.

2. The system of claim 1, wherein the second side of each of the two solar panels is devoid of any photovoltaic cells and is not configured to sense sunlight.

3. The system of claim 1, wherein the second side of each of the two solar panels has a plurality of photovoltaic cells configured to sense sunlight.

4. The system of claim 1, wherein the power bank is one or more batteries or a power company.

5. The system of claim 1, wherein the combination comprises a plurality of distribution centers and solar panels placed one on top of another so as to occupy a footprint of only a single solar panel.

6. The system of claim 1, wherein the at least one combination includes a plurality of stacked combinations.

* * * * *